US008289248B2

(12) United States Patent
Kunkel

(10) Patent No.: US 8,289,248 B2
(45) Date of Patent: Oct. 16, 2012

(54) LIGHT SENSOR WITHIN DISPLAY

(75) Inventor: Lars Peter Kunkel, Dosjebro (SE)

(73) Assignee: Sony Mobile Communications AB, Lund (SE)

(*) Notice: Subject to any disclaimer, the term of this patent is extended or adjusted under 35 U.S.C. 154(b) by 787 days.

(21) Appl. No.: 11/746,694

(22) Filed: May 10, 2007

(65) Prior Publication Data

US 2008/0248837 A1 Oct. 9, 2008

Related U.S. Application Data

(60) Provisional application No. 60/910,345, filed on Apr. 5, 2007.

(51) Int. Cl.
*H04M 1/00* (2006.01)
*H04B 1/38* (2006.01)
*G09G 3/34* (2006.01)
*G09G 3/36* (2006.01)

(52) U.S. Cl. .......................... 345/84; 455/566; 345/102

(58) Field of Classification Search .................. 455/566; 345/84, 102, 214, 698
See application file for complete search history.

(56) References Cited

U.S. PATENT DOCUMENTS

| | | | | |
|---|---|---|---|---|
| 5,490,005 | A | 2/1996 | Jueliger | |
| 7,117,019 | B2 * | 10/2006 | Abbasi | 455/566 |
| 7,352,410 | B2 * | 4/2008 | Chou | 348/673 |
| 7,477,228 | B2 * | 1/2009 | Wyatt | 345/102 |
| 7,742,035 | B2 * | 6/2010 | Wu et al. | 345/102 |
| 7,825,891 | B2 * | 11/2010 | Yao et al. | 345/102 |
| 2003/0197817 | A1 | 10/2003 | Class-Dieter et al. | |
| 2005/0110740 | A1 * | 5/2005 | Linzmeier et al. | 345/102 |
| 2005/0212824 | A1 * | 9/2005 | Marcinkiewicz et al. | 345/690 |
| 2006/0192748 | A1 * | 8/2006 | Lowles et al. | 345/102 |
| 2006/0192749 | A1 * | 8/2006 | Lowles et al. | 345/102 |
| 2007/0097065 | A1 * | 5/2007 | Kreek et al. | 345/102 |
| 2007/0171157 | A1 * | 7/2007 | Choi et al. | 345/81 |
| 2007/0188438 | A1 * | 8/2007 | Fletcher et al. | 345/102 |
| 2007/0211046 | A1 * | 9/2007 | Taylor et al. | 345/207 |
| 2007/0296685 | A1 * | 12/2007 | Kang et al. | 345/102 |
| 2008/0117151 | A1 * | 5/2008 | Nurmi et al. | 345/88 |
| 2008/0227527 | A1 * | 9/2008 | Canterbury et al. | 463/20 |
| 2010/0007638 | A1 * | 1/2010 | Knowles | 345/207 |

FOREIGN PATENT DOCUMENTS

| | | | |
|---|---|---|---|
| DE | 102 27 487 | A1 | 3/2004 |
| WO | WO 2005/104081 | A1 | 11/2005 |

OTHER PUBLICATIONS

International Search Report and Written Opinion dated Apr. 23, 2008 issued in corresponding PCT application No. PCT/IB2007/054053, 14 pages.

* cited by examiner

*Primary Examiner* — Simon Nguyen
(74) *Attorney, Agent, or Firm* — Sreenivas Vedantam; Moore & Van Allen PLLC

(57) ABSTRACT

A mobile communication device with a display may be configured to apply pulse width modulation (PWM) signals to light emitting diodes (LEDs) for providing backlighting for the display, monitor ambient light conditions during off periods of PWM signals applied to the LEDs and adjust the PWM signals based the monitored ambient light conditions.

20 Claims, 7 Drawing Sheets

LIGHT SENSOR WITHIN DISPLAY

RELATED APPLICATION

This application claims priority under 35 U.S.C. §119 based on U.S. Provisional Application Ser. No. 60/910,345, filed Apr. 5, 2007, the disclosure of which is incorporated herein by reference.

TECHNICAL FIELD OF THE INVENTION

The invention relates generally to displays on communications devices and, more particularly, to displays with light sensors.

DESCRIPTION OF RELATED ART

Displays used in communications devices, such as liquid crystal displays (LCDs), require backlighting for image generation on the LCD. In addition, the ambient lighting conditions may also be sensed to adjust the backlighting. Existing, ambient light sensors are located adjacent to the LCD display. Sensing light conditions adjacent to the display may not provide an accurate indication of ambient light that reaches the display surface.

SUMMARY

According to one aspect, a method is provided. The method may comprise providing backlighting to a display; sensing ambient light conditions during off periods of the backlighting; and adjusting a brightness of the backlighting based on the sensed ambient light conditions.

Additionally, the adjusting the brightness of the backlighting may further comprise adjusting the sensed ambient light conditions based on an image on the display.

Additionally, the adjusting the brightness of the backlighting may further comprise changing a duty cycle of a pulse width modulation (PWM) signal.

Additionally, the sensed ambient light conditions may be sensed by light sensors, wherein the light sensors are located adjacent to backlighting LEDs.

Additionally, the light sensors and the backlighting LEDs are located adjacent to a light guide.

Additionally, the display may be a liquid crystal display (LCD).

According to another aspect a mobile communication device is provided. The mobile communication device may comprise a display, the display including: backlighting light emitting diodes (LEDs), light sensors, a liquid crystal display (LCD), and logic configured to: apply pulse width modulation signals to the LEDs, monitor lighting conditions received from the light sensors during off periods of the PWM signals, adjust the monitored intensity based on a currently displayed image, and adjust the PWM signals based on the adjusted monitored intensity.

Additionally, the light sensors may be located adjacent to the LEDs.

Additionally, the light sensors and the LEDs may be located adjacent to a light guide.

Additionally, the known light values are produced by the LCD.

Additionally, the adjusting the PWM signals based on the adjusted monitored intensity may further comprise changing a duty cycle of the PWM signals.

Additionally, the adjusting the PWM signals based on the adjusted monitored intensity may further comprise changing the duty cycle of the PWM signals based on a stored value of the adjusted monitored intensity signal.

Additionally, the light guide is located underneath the LCD.

According to another aspect, a method may be provided. The method may comprise applying pulse width modulation (PWM) signals to light emitting diodes (LEDs) for providing backlighting for a display; monitoring ambient light conditions during off periods of PWM signals applied to the LEDs; and adjusting the PWM signals based the monitored ambient light conditions.

Additionally, the method may further comprise adjusting the monitored ambient light conditions with known lighting values.

Additionally, the adjusting the PWM signals based the monitored ambient light conditions may further comprise changing a duty cycle of the PWM signals.

Additionally, the known light conditions are associated with an image on the display.

Additionally, the adjusting the PWM signals based the monitored ambient light conditions may further comprise changing the duty cycle of the PWM signals based on a stored value of the adjusted monitored intensity signal.

Additionally, the ambient light conditions are monitored by a light sensor, wherein the light sensor is located adjacent to the LEDs.

Additionally, the light sensor and the LEDs are located adjacent to a light guide.

Other features and advantages of the embodiments will become readily apparent to those skilled in this art from the following detailed description. The embodiments shown and described provide illustration of the best mode contemplated for carrying out the invention. The embodiments are capable of modifications in various obvious respects, all without departing from the embodiments. Accordingly, the drawings are to be regarded as illustrative in nature, and not as restrictive.

BRIEF DESCRIPTION OF THE DRAWINGS

Reference is made to the attached drawings, wherein elements having the same reference number designation may represent like elements throughout.

DETAILED DESCRIPTION

The following detailed description of the embodiments refers to the accompanying drawings. The same reference numbers in different drawings identify the same or similar elements. Also, the following detailed description does not limit the embodiments. Instead, the scope of the embodiments is defined by the appended claims and equivalents.

Figure 1:
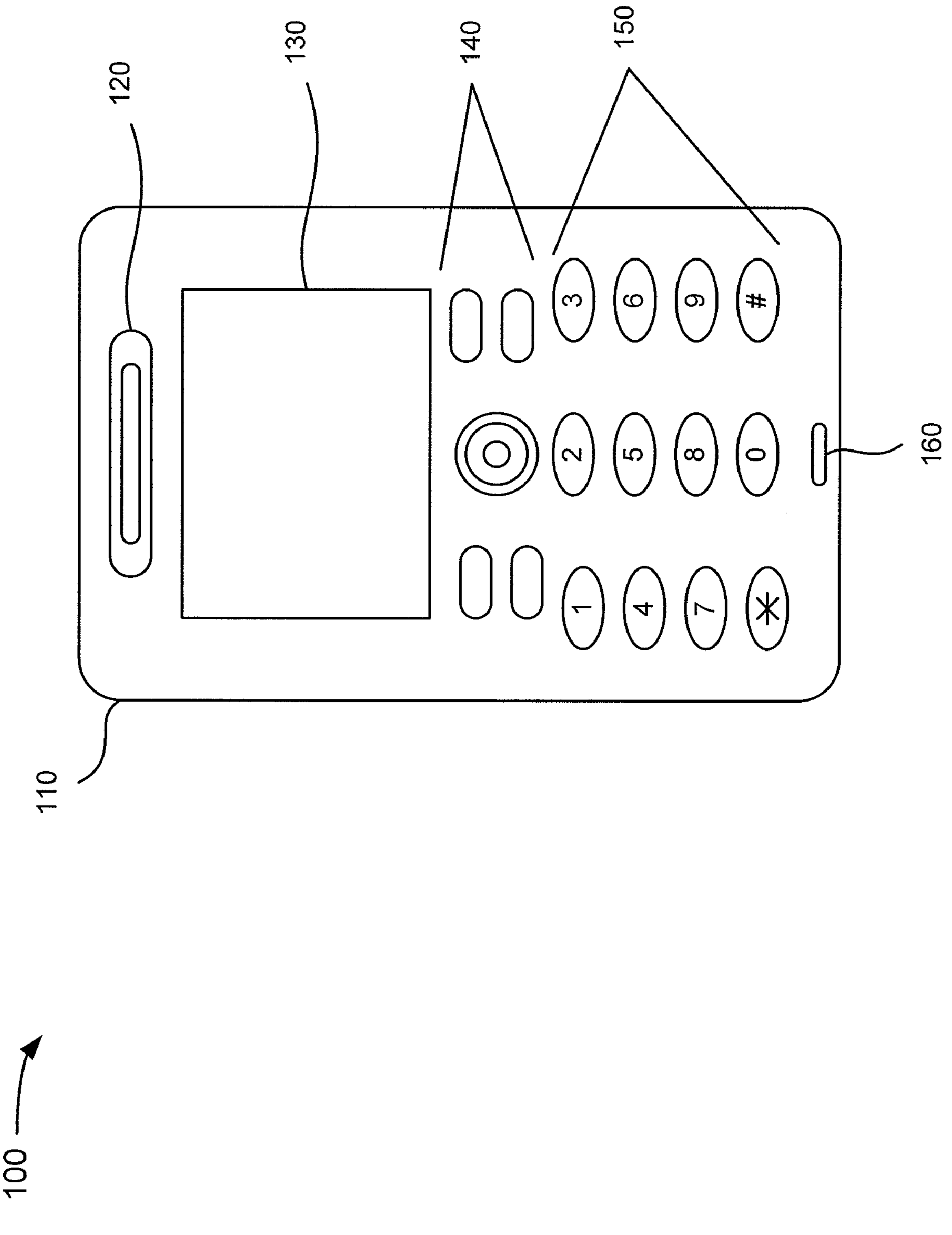
FIG. 1 is a diagram of an exemplary mobile terminal in which methods and systems described herein may be implemented.

FIG. 1 is a diagram of an exemplary mobile terminal 100 in which methods and systems described herein may be implemented. The invention is described herein in the context of a mobile terminal. As used herein, the term "mobile terminal" may include a cellular radiotelephone with or without a multi-line display; a Personal Communications System (PCS) terminal that may combine a cellular radiotelephone with data processing, facsimile and data communications capabilities; a personal digital assistant (PDA) that can include a radiotelephone, pager, Internet/Intranet access, Web browser, organizer, calendar and/or a global positioning system (GPS) receiver; and a conventional laptop and/or palmtop receiver or other appliance that includes a radiotelephone transceiver. Mobile terminals may also be referred to as "pervasive computing" devices. Mobile terminal 100 may also include media playing capability. It should also be understood that systems and methods described herein may also be implemented in other devices that include displays, with or without including various other communication functionality. For example, mobile terminal 100 may include a personal computer (PC), a laptop computer, a PDA, a media playing device (e.g., an MPEG audio layer 3 (MP3) player, a video game playing device), etc.

Referring to FIG. 1, mobile terminal 100 may include a housing 110, a speaker 120, a display 130, control buttons 140, a keypad 150, and a microphone 160. Housing 110 may protect the components of mobile terminal 100 from outside elements. Speaker 120 may provide audible information to a user of mobile terminal 100.

Display 130 may provide visual information to the user. For example, display 130 may provide information regarding incoming or outgoing telephone calls and/or incoming or outgoing electronic mail (e-mail), instant messages, short message service (SMS) messages, etc. Display 130 may also display information regarding various applications, such as a phone book/contact list stored in mobile terminal 100, the current time, video games being played by a user, downloaded content (e.g., news or other information), etc.

In an exemplary implementation, display 130 may be a transflective LCD that includes a light guide and an adjustable or switchable reflector located on the backside of display 130. The adjustable reflector may allow display 130 to be efficiently backlit during low ambient lighting conditions, such as when mobile terminal 100 is being used indoors. The adjustable reflector may also allow ambient or external light with respect to mobile terminal 100 to be efficiently reflected back through the LCD during high ambient lighting conditions to illuminate the LCD. The reflective/transmissive quality of the adjustable reflector may be adjusted or switched based on the particular environment in which mobile terminal 100 is operating.

Control buttons 140 may permit the user to interact with mobile terminal 100 to cause mobile terminal 100 to perform one or more operations, such as place a telephone call, play various media, etc. For example, control buttons 140 may include a dial button, hang up button, play button, etc. In an exemplary implementation, control buttons 140 may include one or more buttons that controls various illumination settings associated with display 130. Further, one of control buttons 140 may be a menu button that permits the user to view various settings associated with mobile terminal 100.

Keypad 150 may include a standard telephone keypad. Microphone 160 may receive audible information from the user.

Figure 2:
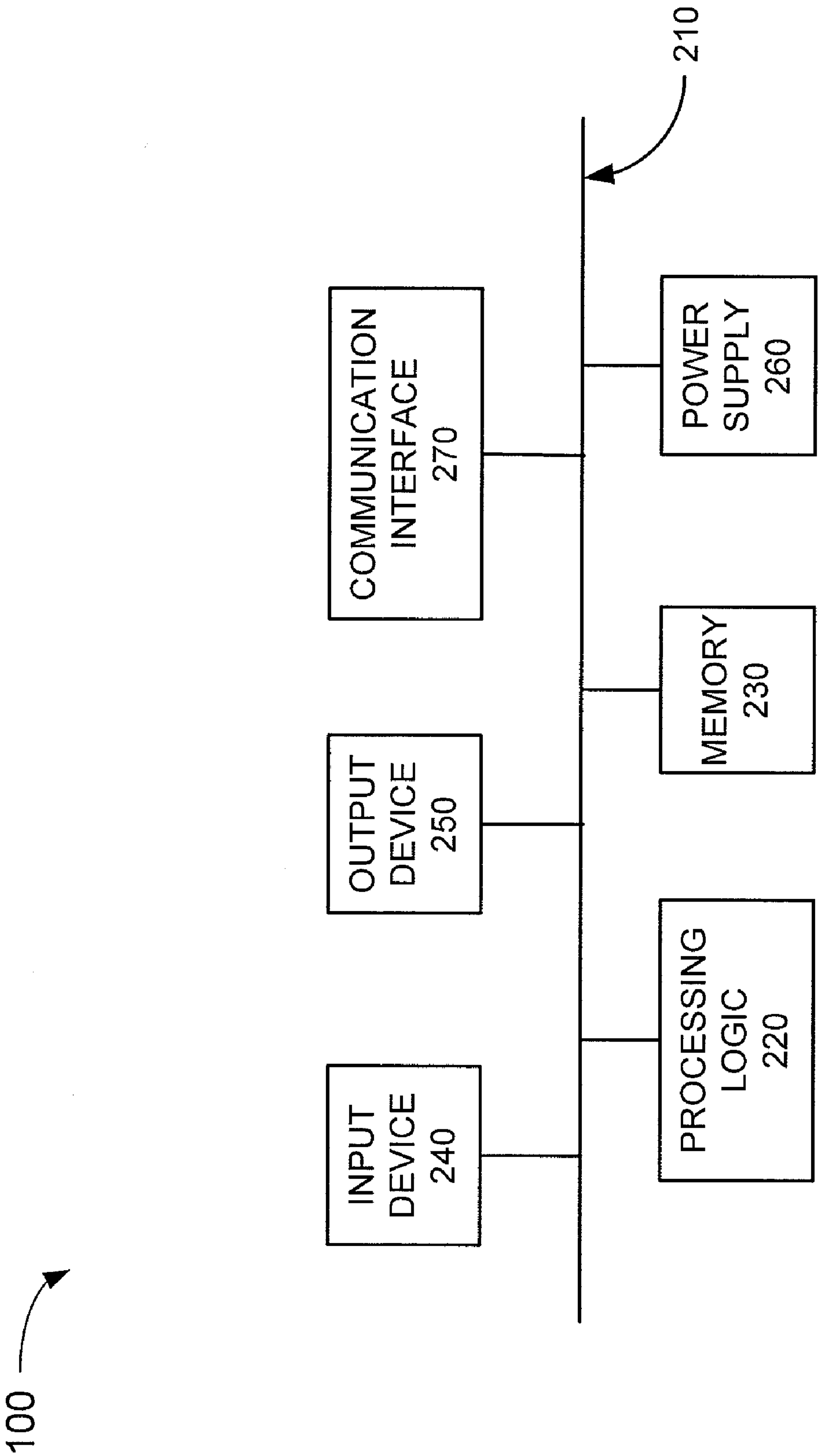
FIG. 2 is a diagram illustrating components of the mobile terminal of FIG. 1 according to an exemplary implementation.

FIG. 2 is a diagram illustrating components of mobile terminal 100 according to an exemplary implementation. Mobile terminal 100 may include bus 210, processing logic 220, memory 230, input device 240, output device 250, power supply 260 and communication interface 270. Bus 210 permits communication among the components of mobile terminal 100. One skilled in the art would recognize that mobile terminal 100 may be configured in a number of other ways and may include other or different elements. For example, mobile terminal 100 may include one or more modulators, demodulators, encoders, decoders, etc., for processing data.

Processing logic 220 may include a processor, microprocessor, an application specific integrated circuit (ASIC), field programmable gate array (FPGA) or the like. Processing logic 220 may execute software instructions/programs or data structures to control operation of mobile terminal 100.

Memory 230 may include a random access memory (RAM) or another type of dynamic storage device that stores information and instructions for execution by processing logic 220; a read only memory (ROM) or another type of static storage device that stores static information and instructions for use by processing logic 220; a flash memory (e.g., an electrically erasable programmable read only memory (EEPROM)) device for storing information and instructions; and/or some other type of magnetic or optical recording medium and its corresponding drive. Memory 230 may also be used to store temporary variables or other intermediate information during execution of instructions by processing logic 220. Instructions used by processing logic 220 may also, or alternatively, be stored in another type of computer-readable medium accessible by processing logic 220. A computer-readable medium may include one or more memory devices and/or carrier waves.

Input device 240 may include mechanisms that permit an operator to input information to mobile terminal 100, such as microphone 160, keypad 150, control buttons 140, a keyboard, a mouse, a pen, voice recognition and/or biometric mechanisms, etc. Input device 240 may also include one or more sensors that enable mobile terminal 100 to identify various external conditions. For example, input device 240 may include a light sensor that detects and/or measures ambient light conditions in the environment in which mobile terminal 100 is operating, as described in detail below.

Output device 250 may include one or more mechanisms that output information to the user, including a display, such as display 130, a printer, one or more speakers, such as speaker 120, etc. Power supply 260 may include one or more batteries or other power source components used to supply power to components of mobile terminal 100. Power supply 260 may also include control logic to control application of power from power supply 260 to one or more components of mobile terminal 100.

Communication interface 270 may include any transceiver-like mechanism that enables mobile terminal 100 to communicate with other devices and/or systems. For example, communication interface 270 may include a modem or an Ethernet interface to a LAN. Communication interface 270 may also include mechanisms for communicating via a network, such as a wireless network. For example, communication interface 270 may include one or more radio frequency (RF) transmitters, receivers and/or transceivers. Communication interface 270 may also include one or more antennas for transmitting and receiving RF data.

Mobile terminal 100 may provide a platform for a user to make and receive telephone calls, send and receive electronic mail, text messages, play various media, such as music files, video files, multi-media files, games, and execute various other applications. Mobile terminal 100 may perform these operations in response to processing logic 220 executing sequences of instructions contained in a computer-readable medium, such as memory 230. Such instructions may be read into memory 230 from another computer-readable medium via, for example, communication interface 270. A computer-readable medium may include one or more memory devices and/or carrier waves. In alternative embodiments, hard-wired circuitry may be used in place of or in combination with software instructions to implement processes consistent with the embodiments. Thus, implementations described herein are not limited to any specific combination of hardware circuitry and software.

Figure 3:
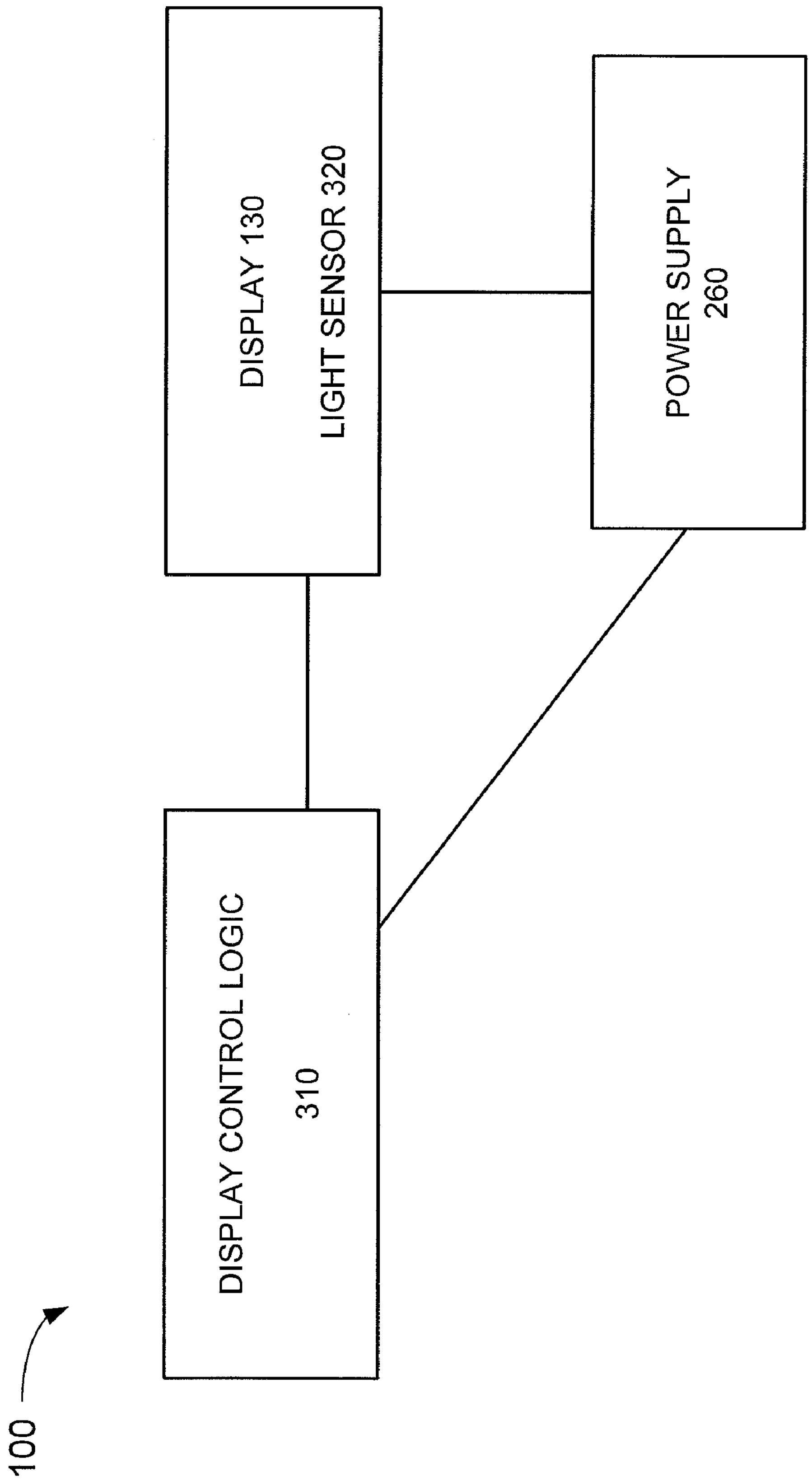
FIG. 3 is a diagram illustrating exemplary components in the mobile terminal of FIG. 1 according to an exemplary implementation.

FIG. 3 is a functional diagram illustrating certain components of mobile terminal 100. The illustrated components include display control logic 310, light sensor 320 and power supply 260. Light sensor 320 may be included within display 130. Display control logic 310 may be included in processing logic 220 and light sensor 320 may be included in input device 240.

Display control logic 310 may switch or change the power applied to one or more components of display 130. For example, display control logic 310 may apply power to components for providing a display and may apply power to components for providing backlighting for display 130. Display control logic 310 may also control and/or adjust the power applied to one or more components of display 130 by using ambient light conditions received (and adjusted) from light sensors. For example, display control logic 310 may access stored values of sensed ambient lighting conditions that may be associated with an appropriate power signal to be applied to backlighting components in display 130.

In one implementation for example, display control logic 310 may signal or instruct power supply 260 to provide power to components in display 130 via pulse width modulation (PWM) signals. For example, the "on" and "off" durations of the PWM signals (pulses) may be changed, based on the sensed ambient or external lighting conditions in order to provide the highest quality image on display 130. Further, the "on" and "off" durations of the PWM signals (pulses) may be changed, based on a predetermined stored values relating the optimum amount of backlight versus the amount of sensed ambient light, as shown and described below with reference to FIGS. 5-6. Display control logic 310 may also add/subtract known light signals (based on the image displayed by LCD cells 410) from sensed light signals and use the remaining signal to obtain an optimum amount of backlighting. Display control logic 310 may then adjust PWM signals by increasing or decreasing a length of an off period of the PWM signals accordingly. In other examples, display control logic 310 may provide power to components in display 130 via direct current (dc) signals, or other types of signals and may adjust these signals in an appropriate manner in order to provide the desired intensity of backlighting.

Light sensor 320 may be a sensor that receives ambient light and generates a signal representing the ambient light conditions. Light sensor 320 may continuously or periodically monitor the ambient light conditions and may automatically provide this signal/information to display control logic 310. In other embodiments, light sensor 320 may continuously monitor ambient light conditions without detecting backlight produced by backlighting components (such as LEDs 420) within display 130. For example, light sensor 320 may be configured to monitor light at frequencies different than the frequency of backlight produced by backlighting components.

Display 130, as will be described in more detail below, may be a transflective LCD display. In an exemplary implementation, display 130 may include one or more films/layers and/or other components that may provide an image via display 130.

Figure 4A:
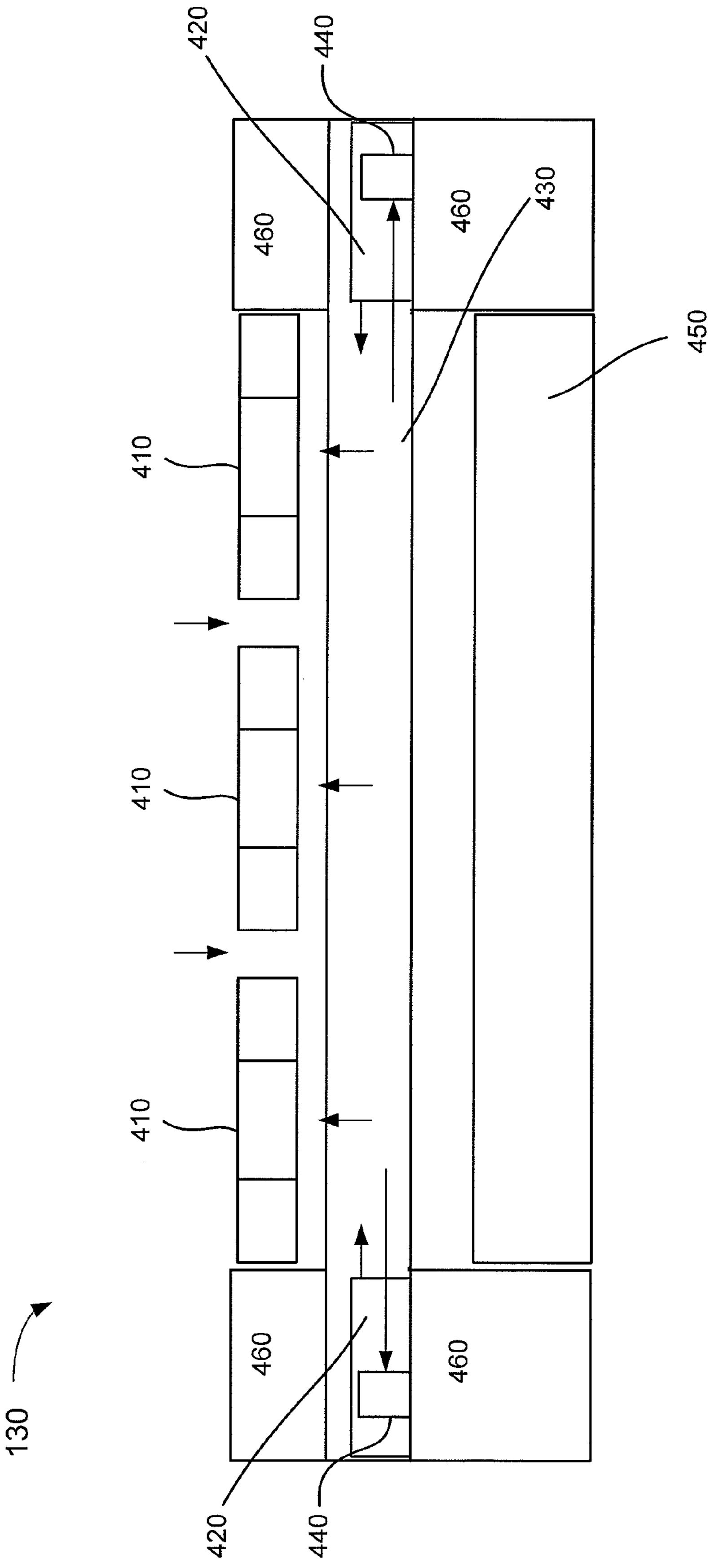
FIG. 4A is a diagram illustrating exemplary implementation of the display of FIG. 1.

FIG. 4A illustrates components of display 130 according to an exemplary implementation. Referring to FIG. 4A, display 130 may include LCD cells 410, LEDs 420, light guide 430, light sensors 440, reflective layer 450 and display housing 460. Although not shown, display 130 may include protective layers above LCD cells 410 and film layers between LCD cells 410 and light guide 430 that may act to increase viewing angles and to spread light.

LCD cells 410 may be any type of liquid crystal display used to display information. LCD cells 410 may receive signals from display control logic 310 to provide an image. LCD cells 410 may require additional light to generate images as may be provided using reflected ambient light and/or light generated from LEDs 420.

LEDs 420 may be any type of light emitting diode used to provide backlighting for display 130. The backlight may be produced by periodically turning on/off LEDs 420. The duty cycle for controlling the on/off of LEDs 420 may be controlled via PWM signals or direct current signals from display control logic 310. Backlighting produced by LEDs 420 (shown by arrows in FIG. 4A) may be directed into light guide 430.

Figure 4B:
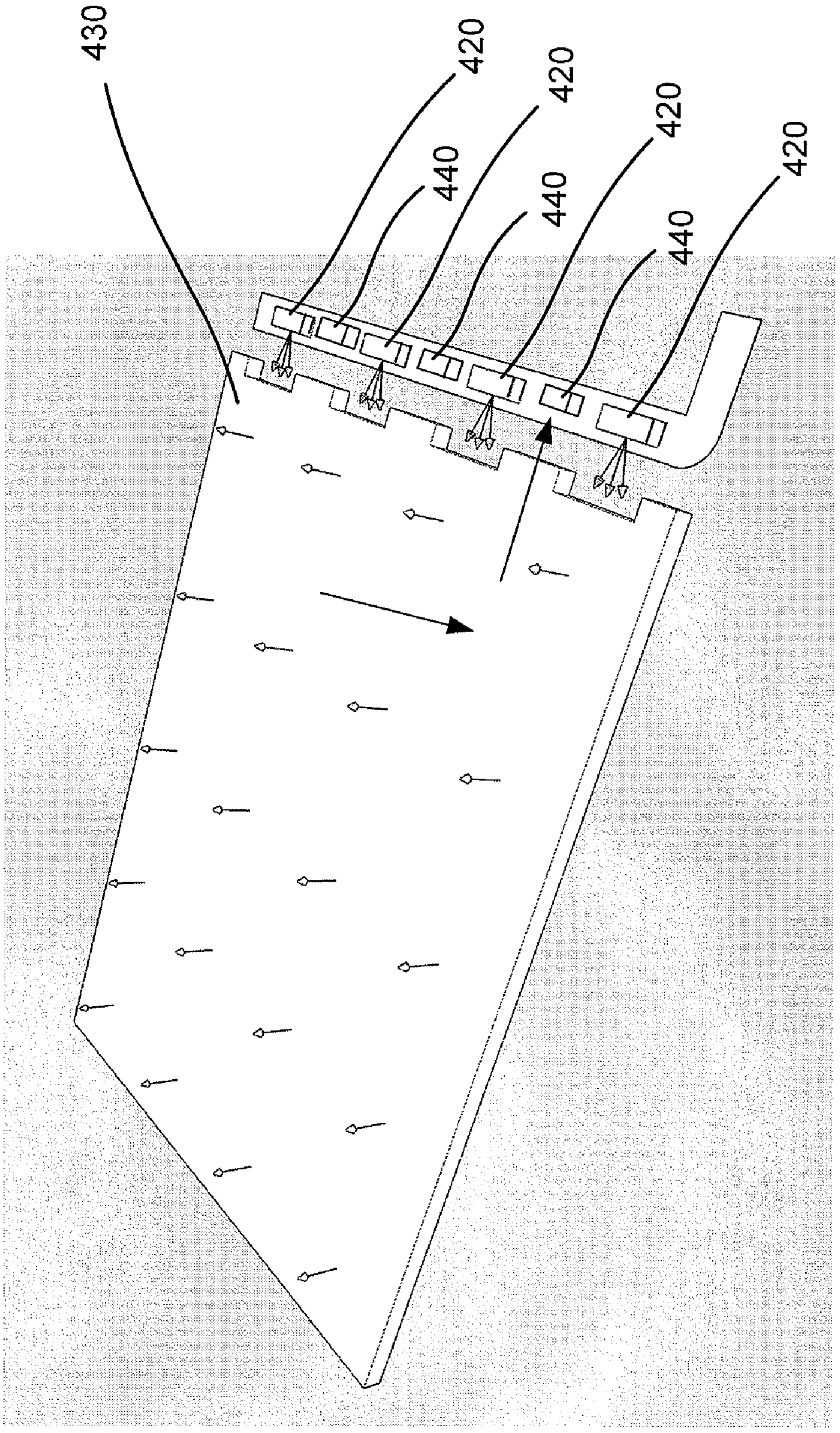
FIG. 4B is a diagram illustrating another exemplary implementation of the display of FIG. 1.

Light guide 430 may be a transparent material or transparent film layer that may receive light (backlight) from LEDs 420 and direct this light up through LCD cells 410. For example, light guide 430 may evenly spread and direct light from LEDs 420 to provide uniform backlighting of display 130. Similarly, light guide 430 may receive ambient light that may have passed through LCD cells 410 and may direct this ambient light toward light sensors 440 located at the edge of light guide 430 (as shown in FIG. 4B). In other embodiments, light guide 430 may direct backlight produced by LEDs 420 up through LCD cells 410 without directing backlight into light sensors 440. In this embodiment, ambient light may be continuously monitored by light sensors 440 without interference from LEDs 420.

Light sensors 440 may be any type of device capable of sensing light. For example, light sensors 440 may be a photo-electric cell or any other type of photo-electric device that produces an electrical signal based on an amount of light received. Light sensors 440 may be located at the edge of light guide 430 and may transmit signals corresponding to an amount of received light to display control logic 310.

Reflective layer 450 may include a layer or layers of material that partially reflects light. For example, reflective layer 450 may include a transition metal, such as iron, nickel, copper, cobalt, or any other of the transition metals. In addition, reflective layer 450 may include a combination of various transition metals and/or one or more alloys including one or more transition metals. The reflective quality of reflective layer 450 may also be changed by applying power (from power supply 260) to reflective layer 450.

Display housing 460 may include structures or housings used to mount display 130 within mobile terminal 100. For example, display housing 460 may be a hard plastic material that mounts components 410-450 within display 130. Display housing 460 may be contained in housing 110, for example.

FIG. 4B illustrates another view of an exemplary implementation of display 130. FIG. 4B includes the same components as described above with reference to FIG. 4A. As shown in FIG. 4B, LEDs 420 and light sensors 440 located at the edge of light guide 430. Small arrows shown in 4B indicate light being emitted from LEDs 420 and directed upward from light guide 430 (that will provide backlighting for display 130). Large arrows shown in FIG. 4B indicate ambient light received by light guide 430 that may be directed to light sensors 440.

Figure 5:
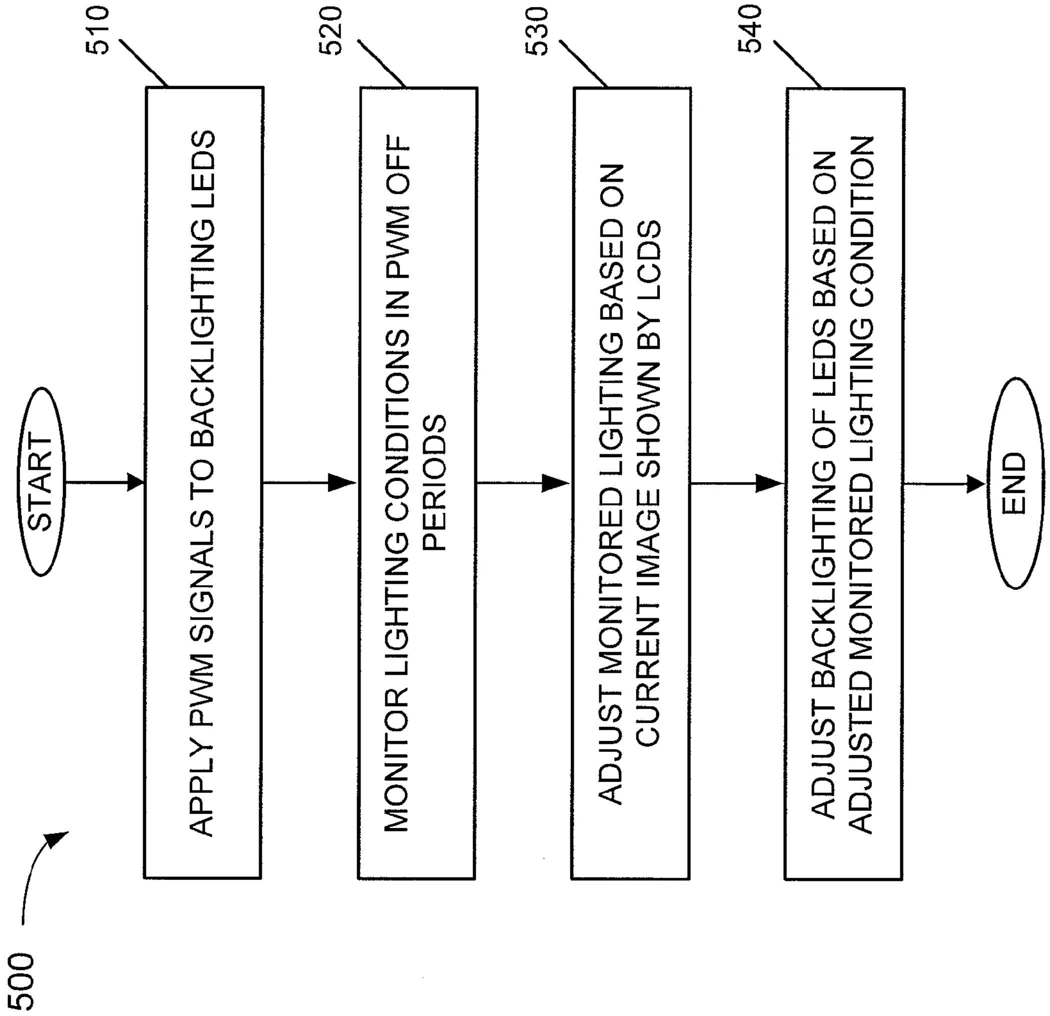
FIG. 5 is a flow diagram illustrating exemplary processing by a mobile terminal.

FIG. 5 is a flow diagram illustrating processing by mobile terminal 100 in an exemplary implementation. Processing may begin by applying PWM signals to the backlighting LEDs (block 510). For example, display control logic 310 may provide signals to power supply 260 to control the pulse widths (on and off periods) to LEDs 420. Display control logic 310 may provide PWM signals based on a standard backlighting value, a last used backlighting value and/or based on sensed ambient light. In other examples, power may be applied to LEDs 420 via direct current signals from power supply 260, as controlled by display control logic 310.

Processing may continue by monitoring ambient light conditions during the off periods of the PWM (block 520). For example, light guide 430 may receive ambient light and guide this light to sensors 440 as shown in FIG. 4B. Display control logic 310 may then receive signals from light sensors 440 during the off periods of the pulses applied to LEDs 420. In this manner, the ambient lighting conditions may be sensed without receiving the light being generated from LEDs 420. In other examples, if power is applied to LEDs 420 via dc signals, the dc signals may be turned off for short periods of time, in order to allow light sensors 440 to sense ambient light without receiving light from LEDs 420. In these examples, it should be understood that the "off" periods during which ambient light may be sensed may be provided by display control logic 310 in any number of ways (i.e., regular or irregular intervals, once per duty cycle or once every 100 cycles, etc.) and may be provided so as to not effect the quality (i.e. be detectable by a user) of backlighting provided to display 130. In still further embodiments, if light sensors 440 are configured to sense light at frequencies other than the frequency of backlight produced by LEDs 420 and/or light guide 430 may direct all backlight produced by LEDs 420 away from light sensors 440, ambient light may be monitored on a continuous basis using light sensors 440.

Once ambient lighting conditions have been detected, processing may continue by adjusting monitored lighting values based on the current image shown by the LCD cells (block 530). For example, display control logic 310 may provide signals to LCD cells 410 to generate and display an image. Using the known signals used to produce the image on LCD cells 410, these known signals may be used to adjust the light signals received from light sensors 440 to give a more accurate signal that relates to ambient light. For example, if most of the LCD cells 410 are displaying black pixels, not much ambient light may be transmitted through LCD cells 410 and be received by light sensors 440. In this example, display control logic 310 may add appropriate lighting values as necessary to ambient light signals received from sensors 440. Conversely, if very few LCD cells 410 are displaying images, the sensed ambient light received by light sensors 440 may be an accurate indication of ambient light intensity, and the sensed ambient light signal may not be adjusted, for example.

Figure 6:
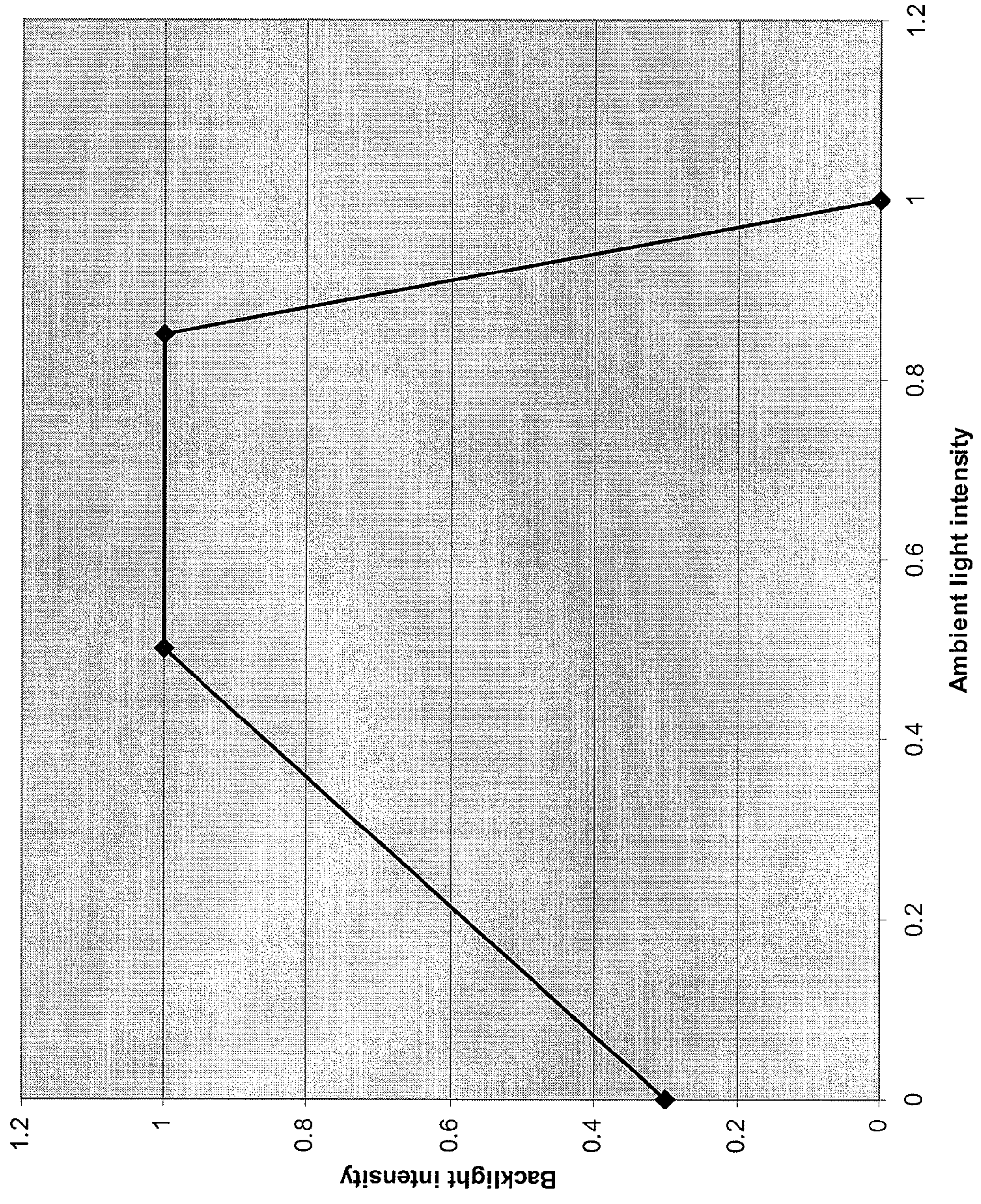
FIG. 6 is a graph illustrating a relationship between an intensity of backlight versus sensed ambient light that may be used by the exemplary processing shown in FIG. 5.

Processing may continue by adjusting power to the LEDs 420 based on this adjusted signal (block 540). For example, display control logic 310 may adjust the duty cycle of the PWM signals to control LEDs 420. For example, display control logic 310 may adjust the PWM signals by increasing or decreasing a length of an off period of the PWM signals based on predetermined stored values relating an optimum value of backlighting with the amount of sensed ambient light. These stored values of backlight and associated ambient light may be stored in a look-up-table within display control logic 310, for example. These stored and associated values of backlight and ambient light may form a relationship as shown graphically in FIG. 6. Referring to FIG. 6 for example, if the adjusted signal relating to the sensed amount of ambient light is 0.4, the backlighting power signal may be 0.8 for example. In another example, if the adjusted signal of ambient light is 0.2, the backlighting power signal may be 0.6. In one example, a backlighting power signal of 0.6 (60%) may correspond to PWM duty cycles, where the PWM signal has an "on" period 60% of the time and an "off" period for 40% of the time. In other examples, it should be understood that the values shown in FIG. 6 are relative values and may not directly correspond exactly to a duty cycle. For example, a backlighting intensity signal of 1.0 may correspond to a PWM duty cycle of 50% "on" and 50% "off." In other examples, the type of signal applied to LEDs 420 may not be PWM signals, therefore the relative values shown in FIG. 6 may be used to appropriately adjust the type of driving signal accordingly.

As shown in FIG. 6, the amount of backlight produced by LEDs 420 may be increased as ambient light increases up to a certain value (approximately 0.5). At levels of ambient light between 0.5 and 0.8 a full amount of backlighting may be applied by LEDs 420. At some point (approximately 0.8) the amount of ambient light is so intense that the backlighting produced by LEDs 420 may be turned off, as it does not effect the quality of the image provided on display 130. Using these stored values based on the predetermined relationship (as shown in FIG. 6) between sensed ambient light and backlighting, display control logic 310 may increase or decrease the length of an off period of the PWM signals to LEDs 420 to provide the desired amount of backlighting to enhance viewing of the image provided on display 130.

CONCLUSION

Implementations described herein provide light sensors within a display, where ambient lighting conditions may be sensed during periods when the backlighting is off. The backlighting LEDs may be adjusted based on the sensed ambient light conditions. Advantageously, this may more accurately adjust backlighting based on sensed ambient lighting conditions.

The foregoing description of the embodiments of the embodiments provides illustration and description, but is not intended to be exhaustive or to limit the embodiments to the precise form disclosed. Modifications and variations are possible in light of the above teachings or may be acquired from practice of the embodiments.

For example, aspects of the embodiments have been mainly described in the context of a mobile terminal. The embodiments, however, may be used with any type of device that includes a display.

Further, while series of acts have been described with respect to FIG. 5, the order of the acts may be varied in other implementations consistent with the embodiments. Moreover, non-dependent acts may be performed in parallel.

It will also be apparent to one of ordinary skill in the art that aspects described herein may be implemented in methods and/or computer program products. Accordingly, aspects of the embodiments may be embodied in hardware and/or in software (including firmware, resident software, micro-code, etc.). Furthermore, aspects described herein may take the form of a computer program product on a computer-usable or computer-readable storage medium having computer-usable or computer-readable program code embodied in the medium for use by or in connection with an instruction execution system. The actual software code or specialized control hardware used to implement aspects consistent with the principles of the embodiments is not limiting of the embodiments. Thus, the operation and behavior of the aspects were described without reference to the specific software code—it being understood that one of ordinary skill in the art would be able to design software and control hardware to implement the aspects based on the description herein.

Further, certain aspects described herein may be implemented as "logic" that performs one or more functions. This logic may include hardware, such as a processor, microprocessor, an application specific integrated circuit or a field programmable gate array, software, or a combination of hardware and software.

It should be emphasized that the term "comprises/comprising" when used in this specification is taken to specify the presence of stated features, integers, steps, or components, but does not preclude the presence or addition of one or more other features, integers, steps, components, or groups thereof.

No element, act, or instruction used in the description of the present application should be construed as critical or essential to the embodiments unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

The scope of the embodiments is defined by the claims and their equivalents.

What is claimed is:

1. A method comprising:

providing backlighting to a display;

sensing ambient light conditions during off periods of the backlighting; where the sensed ambient light conditions are sensed by one or more light sensors;

adjusting the sensed ambient light conditions based on an image on the display; and adjusting a brightness of the backlighting based on the adjusted sensed ambient light conditions, where the adjusted sensed ambient light conditions are different from the sensed ambient light conditions.

2. The method of claim 1, where adjusting the sensed ambient light conditions based on an image on the display further comprises:

adding or subtracting known light conditions from the sensed ambient light conditions, where the known light conditions are associated with the image on the display.

3. The method of claim 1, wherein adjusting the brightness of the backlighting further comprises:

changing a duty cycle of a pulse width modulation signal.

4. The method of claim 1, where the light sensors are located adjacent to backlighting light emitting diodes or located adjacent to a light guide.

5. The method of claim 1, where the display comprises one or more display cells, and where the adjusting the sensed ambient light conditions based on an image on the display comprises:

determining a number of the one or more display cells that are displaying images; and in response to determining the number of the one or more display cells displaying images or parts of an image is greater than a threshold number, adjusting the sensed ambient light conditions.

6. The method of claim 1, where adjusting a brightness of the backlighting based on the adjusted sensed ambient light conditions further comprises:

accessing a look-up table that stores backlighting values and sensed ambient light condition values, where each sensed ambient light condition value is associated with at least one backlighting value; and determining, from the look-up table, a backlighting value associated with the adjusted sensed ambient light condition value; and adjusting a brightness of the backlighting based on the determined adjusted sensed ambient light condition value.

7. The method of claim 6, where the backlighting values and sensed ambient light condition values form a graphical relationship, where the backlighting values increase for sensed ambient light condition values greater than zero but less than a first threshold sensed ambient light condition value, where the backlighting values do not increase for sensed ambient light condition values greater than the first threshold sensed ambient light condition value but less than a second threshold sensed ambient light condition value, and where the backlighting values decrease for sensed ambient light condition values greater than the second threshold sensed ambient light condition value.

8. The method of claim 1, where the sensing ambient light conditions during off periods of the backlighting further comprises:

in response to determining the one or more light sensors are configured to sense ambient light conditions associated with one or more frequencies other than one or more frequencies associated with the backlighting, directing the backlighting away from the one or more light sensors.

9. The method of claim 1, where the providing backlighting to a display comprises providing backlighting to the display during on periods of the backlighting, and where the adjusting a brightness of the backlighting based on the adjusted sensed ambient light conditions comprises adjusting a duration of each off period of the backlighting based on the adjusted sensed ambient light conditions.

10. A mobile communication device comprising:

a display, the display including:

light emitting diodes for providing backlight, light sensors for sensing light, a display for displaying images, and logic to:

apply pulse width modulation signals to the light emitting diodes, monitor an intensity of light received from the light sensors during off periods of the applied pulse width modulation signals, where the monitored intensity is a pre-adjusted monitored intensity, and adjust the monitored intensity based on a currently displayed image produced on the display, and adjust the signals based on the adjusted monitored intensity, and not based on the pre-adjusted monitored intensity.

11. The mobile communication device of claim 10, wherein the light sensors or the light emitting diodes are located adjacent to a light guide.

12. The mobile communication device of claim 11, wherein the light guide is located underneath the display.

13. The mobile communication device of claim 10, wherein adjusting the plus width modulation signals based on the adjusted monitored intensity further comprises:

changing a duty cycle of the pulse width modulation signals.

14. The mobile communication device of claim 13, wherein adjusting the plus width modulation signals based on the adjusted monitored intensity further comprises:

changing the duty cycle of the plus width modulation signals based on a stored value of the adjusted monitored intensity.

15. A method comprising:

applying pulse width modulation signals to light emitting diodes for providing backlighting for a display;

monitoring ambient light conditions, by a light sensor, during off periods of plus width modulation signals applied to the light emitting diodes;

adjusting the modulation ambient light condition based on an image on the display; and adjusting the pulse width modulation signals based on the adjusted monitored ambient light conditions, where the adjusted monitored ambient light conditions are different from the monitored light conditions.

16. The method of claim 15, where adjusting the monitored ambient light conditions based on an image on the display further comprises:

adding or subtracting known light conditions from the monitored ambient light conditions.

17. The method of claim 16, wherein the known light conditions are associated with an image on the display.

18. The method of claim 15, where the adjusting the pulse width modulation signals based on the adjusted monitored ambient light conditions further comprises:

changing a duty cycle of the pulse width modulation signals.

19. The method of claim 18, where the adjusting the pulse width modulation signals based on the adjusted monitored ambient light conditions further comprises:

changing the duty cycle of the pulse width modulation signals based on a stored value of the adjusted monitored intensity, where the stored adjusted monitored intensity corresponds with the adjusted monitored ambient light conditions.

20. The method of claim 15, where the light sensor and the light emitting diodes are located adjacent to a light guide.

* * * * *

UNITED STATES PATENT AND TRADEMARK OFFICE

CERTIFICATE OF CORRECTION

PATENT NO. : 8,289,248 B2
APPLICATION NO. : 11/746694
DATED : October 16, 2012
INVENTOR(S) : Lars Peter Kunkel It is certified that error appears in the above-identified patent and that said Letters Patent is hereby corrected as shown below:

Column 11, line 4, replace “wherein” with “where”;

Column 11, line 4, replace “plus” with “pulse”;

Column 11, line 6, replace “plus” with “pulse”;

Column 11, line 13, replace “plus” with “pulse”;

Column 11, line 15, replace “modulation” with “monitored”;

Column 11, line 15, replace “condition” with “conditions”;

Column 12, line 4, replace “an image” with “the image”.

Signed and Sealed this
Fourth Day of December, 2012

David J. Kappos

David J. Kappos
*Director of the United States Patent and Trademark Office*